(12) United States Patent
de Lima Portilho

(10) Patent No.: US 8,877,272 B2
(45) Date of Patent: Nov. 4, 2014

(54) 1-MONOPROPIONINE COMPOUND AND ITS ISOMER 3-MONOPROPIONINE AS PRESERVING AGENTS FOR ANIMAL FEED, GRAINS AND ANIMAL-ORIGIN MEALS

(71) Applicant: Paulo Roberto de Lima Portilho, Santa Bárbara do Oeste (BR)

(72) Inventor: Paulo Roberto de Lima Portilho, Santa Bárbara do Oeste (BR)

( * ) Notice: Subject to any disclaimer, the term of this patent is extended or adjusted under 35 U.S.C. 154(b) by 0 days.

(21) Appl. No.: 13/743,553

(22) Filed: Jan. 17, 2013

(65) Prior Publication Data
US 2013/0131168 A1 May 23, 2013

Related U.S. Application Data

(63) Continuation-in-part of application No. 12/611,224, filed on Nov. 3, 2009, now abandoned.

(30) Foreign Application Priority Data

Aug. 17, 2009 (BR) .............................. 015090002468

(51) Int. Cl.
*A23K 3/00* (2006.01)
*A23K 1/16* (2006.01)
*A23B 9/26* (2006.01)
*A23L 3/3517* (2006.01)
*A23B 4/20* (2006.01)

(52) U.S. Cl.
CPC ............. *A23L 3/3517* (2013.01); *A23K 1/1634* (2013.01); *A23B 9/26* (2013.01); *A23K 3/00* (2013.01); *A23B 4/20* (2013.01); *A23K 1/1609* (2013.01); *Y10S 426/805* (2013.01); *Y10S 426/807* (2013.01)
USPC ........... 426/335; 426/532; 426/544; 426/805; 426/807

(58) Field of Classification Search
USPC .......................... 426/335, 532, 544, 805, 807
See application file for complete search history.

(56) References Cited

U.S. PATENT DOCUMENTS

| 2,173,124 | A | * | 9/1939 | Conklin et al. ............... 560/254 |
| 3,812,269 | A | * | 5/1974 | Mueller et al. .................. 426/97 |
| 4,806,353 | A | * | 2/1989 | Thomas ......................... 424/601 |
| 4,824,686 | A | * | 4/1989 | Dunn et al. .................... 426/532 |
| 5,429,828 | A | * | 7/1995 | Fodge et al. ..................... 426/18 |
| 5,935,625 | A | * | 8/1999 | Hjørnevik et al. .............. 426/74 |
| 7,981,452 | B2 | * | 7/2011 | de Levita et al. ............... 426/94 |
| 2002/0172737 | A1 | * | 11/2002 | Pinski et al. ....................... 426/2 |
| 2009/0263549 | A1 | * | 10/2009 | Kleve et al. ................... 426/332 |

FOREIGN PATENT DOCUMENTS

| CA | 1168078 | A | * | 5/1984 |
| SU | 701631 | A | * | 12/1979 |

* cited by examiner

*Primary Examiner* — Chhaya Sayala
(74) *Attorney, Agent, or Firm* — Ming Chow; Sinorica, LLC

(57) ABSTRACT

An application method of 1-monopropionine compound and its isoform 3-monopropionine being used as preserving agents in animal feeds, corns, grains, and other food materials. The monopropionine compounds are obtained by esterification reaction of propionic acid and glycerol. The product is a translucent viscous liquid composition comprising monopropionine compounds and other components, such as free acid, or certain salt forms of propionate. The generated composition can be further distilled in glycerol. The final product can take a liquid form or a powder form. 1-monopropionine compound and its isoform 3-monopropionine function as preserving agent at a low effective dosage of about 0.05 to 1% (by weight), and preferably 0.1 to 0.3% (by weight). A preferable application condition of this method is to preserve animal feeds and corns under a low (about 2% to 12%) moisture condition.

4 Claims, No Drawings

1-MONOPROPIONINE COMPOUND AND ITS ISOMER 3-MONOPROPIONINE AS PRESERVING AGENTS FOR ANIMAL FEED, GRAINS AND ANIMAL-ORIGIN MEALS

The subject application is a continuation-in-part (CIP) of U.S. patent application Ser. No. 12/611,224, filed on Nov. 3, 2009, now abandoned; wherein the U.S. priority application is herein incorporated by reference.

TECHNICAL FIELD

The subject invention is related to the technical field of application for preserving agents in animal feeds and other food materials or products, such as corns, grains and flours. In particular, it is related to the use of 1-monopropionine compound and its isomer 3-monopropionine as preserving agents for animal feeds and other food materials or products, with the object to reduce the contaminations induced by deleterious fungi, yeasts or bacteria (especially *Salmonella* spp. and *E. Coli* spp.) in these animal feeds or food products. The application of these preserving agents can therefore improve the quality and safety of the preserved animal feeds or food products. This would further contribute to enhance the animal growth and improve their health.

BACKGROUND OF THE INVENTION

The application of preserving agents, such as certain organic acids, in animal feeds, corns, grains and flours has been known for quite a long time. The most commonly used preserving agents function by means of controlling microbe growth; hence reducing the microbiological contaminations in these animal feeds, corns, grains and flours. Currently, a majority of the commonly used preserving agents are made by pure organic acids or their corresponding salts of calcium, sodium, potassium or ammonium (e. g. ammonium propionate, calcium propionate, potassium formate and many others). These preserving agents have various effective dosages, from about 0.1% (by weight) to as high as 10% (by weight). Therefore, in many cases such as animal feed production, and corn or grain storage (in silo), the required dosage and total application amount of a particular preserving agent could be very high.

Regarding to the applications of these preserving agents, it appears that there are many disadvantages and inconveniences associated with these commonly used organic acid or their corresponding salts. Among these problems, many are related to the food or animal feed products' safety or economical concerns. It is well known that the actions of these pure organic acids are effective yet frequently very intensive against the growth of bacteria, fungi and yeasts. However, in many cases, the same is also true for the animals or humans who consume the feeds or foods that contains these preserving agents, as well as to the workers or operators who contact these preserving agents during the manufacturing processes. It is already known that the corrosiveness and volatility of many these chemical agents may lead to mucosa irritation or other health issues.

These issues were only partially solved by using the salt form of these organic acids, as the corresponding salts are usually much less corrosive and less volatile than the acids. Nevertheless, their application as preserving agents has brought up certain new issues. As preserving agents, the effective activity of these salts are usually 100 to 1000 times lower than that of their corresponding acids (e. g. propionic acid in comparison with calcium propionate). This fact suggests that the effective dosage and total application amount of these salt preserving agents could be very high, which may result in new economical and health concerns.

With the aim to solve the aforementioned issues in the field, the subject invention was trying to find a type of compounds that are safe for both animals and humans, whose application procedure/method as preserving agents only needs a quite low effective dosage and that would prevent corrosion of storage facilities and equipments. In comparison with those organic acids, these compounds should be relatively non-corrosive and nonvolatile. On the other hand, in comparison with those salt preserving agents, they should be much more efficient at controlling the bacterial and fungal growth; hence their effective dosages can be much lower than those of the salts. Therefore, the application of these compounds as preserving agent would be characterized as non-corrosive, non-volatile, safe and with a very low effective dosage. In this way, the application of these compounds will help to solve many of the aforementioned health and economical concerns.

The improvement offered by these compounds for controlling bacterial and fungal growth may be proven by means of experimental data, wherein samples of animal feed or food products are produced under different concentrations of these preserving agents and submitted to fungal challenge (inoculation with spores) and bacterial challenge (inoculation with bacteria), and later analysis to determine the efficiency of their functions to reduce the fungal or bacterial loads.

SUMMARY OF THE INVENTION

According to the subject invention, there are provided methods related to the application of 1-monopropionine compound and its isomer 3-monopropionine as preserving agents for animal feeds, corns, grains, flours and other food materials. In one aspect of the subject invention, the compounds 1-monopropionine and its isoform 3-monopropionine are obtained by the esterification reaction of propionic acid on positions 1 or 3 of carbon in glycerol molecule. The reaction between glycerol and propionic acid is undertaken at a relatively high temperature (preferably 280° C.), and under vacuum. The reaction product is usually a translucent viscous liquid with a low melting point (8° C.), preferably containing between 25% and 52% (by weight) of propionic acid in its final constitution.

In another aspect of the subject invention, the generated composition is further distilled. To make the final preserving agent products, the generated monopropionine compounds-containing composition could be further separated by distillation form any other component. Alternatively, it could be sprayed on an absorbing substance (usually highly active clay or silica) to obtain a powder product.

Further according to the subject invention, the application of 1-monopropionine compound and its isomer 3-monopropionine as preserving agents is with a quite low effective dosage of 0.05 to 1% (by weight), and preferably 0.1 to 0.3%. Moreover, as preserving agent, they can be applied under a low moisture condition, such as 2 to 12% moisture.

DETAILED DESCRIPTION OF THE INVENTION

The subject invention is related to the application of 1-monopropionine compound and its isomer 3-monopropionine as preserving agents for animal feeds, corns, grains, flours and many other food materials. The monopropionine compounds are generated by esterification of propionic acid on the positions 1 or 3 of carbon in glycerol molecule. Glycerol contains a three carbon chain with three OH groups attached. Propionic acid is a naturally occurring carboxylic acid with chemical formula CH3CH2COOH. These two molecules react by a condensation reaction (a reaction in which a molecule of water is removed).

The reaction between glycerol and propionic acid is performed at a relatively high temperature (preferably 280° C.) and under vacuum. The final product is a translucent viscous liquid with a low melting point (8° C.), preferably containing between 25% and 52% (by weight) of propionic acid in its final constitution.

The estrification product composition that contains compounds 1-monopropinine and its isomer 3-monopropinine can be further distilled. On the other hand, concerning the esterification reaction, it is almost always true that only a portion of the propionic acid is reacted with glycerol to form the ester products. Thus there is always some free propionic acid included in the final product mixture. It is rather impossible to get such a reaction with no free propionic acid left. If one tries really hard, he or she may end up with quite a lot Diester products (dipropionine). But such Diester products are useless for the purpose of the subject invention, because they do not have any preserving activities.

As being mentioned above, during the esterification process whereby the monopropionine compounds are generated, we would end up with a product composition containing the "new component" of ester compounds. But the reaction is not complete, as not all of the propionic acid is being reacted. The final ester products are generated by about 30-42% (by weight) propionic acid reacting to glycerol in this esterification process. And it will end up with about 6-12% (by weight) free propionic acid in the final mixture solution. Due to these facts, if the final product mixture is analyzed for its proionic acid content without breaking the ester bond, it will be found about 6-12% (by weight) propionic acid in it. However, if the ester bond is specifically broken in the analysis, it would be found about 50% propionic acid in the mixture (the free acid plus that being released from the ester bond).

Following the esterification reaction that generates monopropionine compounds, the final product compositions used as preserving agent could have various components and characteristics; and may take different forms. For example, in the preserving agent, the monopropionine compounds (1-monopropionine compound and its isomer 3-monopropionine), are with 30% to 42% (by weight) propionic acid as we mentioned above. In addition, the composition may also comprise 6% to 12% (by weight) free acid form of propionic acid in glycerol.

In other examples, the composition contains the monopropionine compounds that is with 30% to 42% (by weight) propionic acid. Moreover, it may also comprise about 6% to 12% (by weight) sodium propionate in glycerol; or 6% to 12% (by weight) potassium propionate in glycerol. In another example, the preserving agent could contain the monopropionine compounds that is with 25% to 42% (by weight) propionic acid. And it may further comprise about 6% to 12% (by weight) ammonium propionate in glycerol.

Furthermore, the final preserving agent product that contains 1-monopropinine compound and its isoform 3-monopropionine might be in a liquid form, which could be further diluted in glycerol or water. Alternatively, it can be in a powder form by combining it with the liquid form of the ammonia, sodium or potassium salts of propionic acid. They are next being sprayed to and absorbed by an absorbing substance, such as a powder form of highly active clay or silica, in order to obtain the final powder preserving agent product.

As being discussed previously, one major challenge faced by the food preserving industry is that many preserving agents are associated with potential health and economical concerns. For instance, certain organic acid can function to control microbe growth at relatively low effective dosages, such as 0.1% to 1% (by weight). However, as chemical acids, many of them are corrosive and volatile; hence they could lead to mucosa irritation and many other health problems. On the other hand, the corresponding salt forms of these organic acids were found also having the preserving functions. Such salt forms are usually associated with a much lower safety and health concerns. However, most of these salts are not as efficient as their organic acid forms. Their effective dosages sometimes are as high as 1000 fold lower of those of the organic acids. Due to these reasons, such salts may have potential health and economical issues, too, as their effective dosages and final application amounts are considerably high.

In the subject invention, we found that by using the application method disclosed in this application, the effective dosages of 1-monopropionine compound and its isoform 3-monopropionine are as low as 0.05% (by weight), with an effective dose range from 0.05% to 1% (by weight). Hence, with the application method disclosed in the subject invention, as relatively safe ester form preserving agents, 1-monopropionine compound and its isoform 3-monopropionine have a huge potential as preserving agents used in animal feeds, corns, grains, flours and many other food materials or products; and will certainly be well received by the food preserving industry.

It was found that at the dosage of about 0.05 to 1% (by weight), the monopropionine compounds can effectively function as preserving agents for animal feeds. And the more preferable dosage would be 0.1 to 0.3% (by weight) in animal feeds. At these dosages, the monopropionine compounds were found to effectively control microbe growth; and preserve animal feeds, corns, grains and many other food materials.

Combined with their very low safety/health concerns, this low effective dosage make the disclosed application method of using 1-monopropionine compound and its isoform 3-monopropionine as preserving agent has a big commercial potential. Compared with the dosages (usually around 1% to 10%) associated with those "safe" preserving agents (such as the aforementioned organic acid salts), the effective dosage of monopropionine compounds as disclosed in the subject invention is only 0.1 to 0.3%. The significance of this difference would be much clear if we consider the scenario that sometimes a feed mill or a grain storage silo will receive about 10,000 to 100,000 tons of materials per month. If it needs 1 to 10% dosing of a preserving agent, some thousands of tons of preserving agent have to be frequently added into the food materials. This certainly would become a huge logistics burden. Let alone the potential health concerns associated with the addition of this very high amount of chemicals in the food materials, which may be transferred to the human body finally. Nevertheless, with the method disclosed in the subject invention for using of monopropionine compounds as preserving agents, it only needs about 1/10 of this amount. Hence the related working load would be 10 times less; and the potential health concern would also be 10 times lower.

It also need to be mentioned that the measurements, quantities and values may vary according to the requirements of usage and type of animal feed, food corn, grains and flours, as long as the same essential characteristics are maintained.

Moreover, one preferable application condition of this disclosed low-dosage method is under a relatively low-moisture condition (about 2% to 12% moisture). It is well known that the type of microbe that grows in certain condition is dependent on a few factors; and the moisture content (or water activity, which is directly linked to moisture) is one of the most important factors. The details could be found in such reference books like Food Chemistry (Second Edition, New York: Marcell Dekker, Inc., 1985, by Fennema), and The Art of Making Fermented Sausages (Denver, Colo.: Outskirts Press (ISBN 978-1-4327-3257-8), 2008, by Marianski). It was found in the subject invention that under this low moisture condition, monopropionine compounds function very efficient as preserving agents.

As the final step of this application method, at these low effective dosages, 1-monopropionine compound and its isoform 3-monopropionine are being mixed with the to be preserved materials, such as animal feeds, corns, grains and flours, in a traditional mixer.

The foregoing subject invention has been described in details by way of description and example for purpose of clarity and understanding. As is readily apparent to one skilled in the art, the above-mentioned specifications are only to describe examples of the invention and shall not be construed as a limitation of the scope of the invention. Thus, any variations, changes, modifications and alterations may be applied to the compositions and methods described herein without departing from the true spirit, concept and scope of the invention.

What is claimed is:

1. A method for applying a preserving agent for foods or animal feeds to be preserved, comprising mixing propionic acid and glycerol at a temperature of 280° C., and under vacuum;

obtaining a composition comprising 1-monopropionine and 3-monopropionine, wherein said composition being a translucent viscous liquid with a melting point of 8° C.; and making a first concentration of propionic compound within a range from 48% to 52% by weight of the preserving agent, wherein said propionic compound comprising pronionic acid in salt or free acid form and monopropionine in esterified form; and applying the preserving agent with the second concentration of said 1-monopropionine in said composition at 0.05% to 1% by weight of a material to be preserved.

2. The method for applying the preserving agent for the foods or animal feeds to be preserved of claim 1, wherein said preserving agent comprising 25% to 52% by weight of propionic acid in its final constitution.

3. The method for applying the preserving agent for the foods or animal feeds to be preserved of claim 1, comprising said second concentration being 0.1 to 0.3% by weight.

4. The method for applying the preserving agent for the foods or animal feeds to be preserved of claim 1, comprising applying said preserving agent to the material to be preserved at a condition that the material to be preserved has a 2% to 12% moisture.

* * * * *